(12) United States Patent
Färber

(10) Patent No.: US 7,083,754 B1
(45) Date of Patent: Aug. 1, 2006

(54) SAMPLING TUBE AND METHOD OF MAKING SAME

(75) Inventor: Horst Färber, Nümbrecht (DE)

(73) Assignee: Sarstedt AG & Co., Numbrecht (DE)

( * ) Notice: Subject to any disclaimer, the term of this patent is extended or adjusted under 35 U.S.C. 154(b) by 595 days.

(21) Appl. No.: 09/603,528

(22) Filed: Jun. 23, 2000

(30) Foreign Application Priority Data

Jun. 25, 1999 (DE) ................ 199 29 665

(51) Int. Cl.
*B29C 57/10* (2006.01)
*B29C 51/42* (2006.01)
(52) U.S. Cl. ............ 264/296; 264/295; 264/328.1
(58) Field of Classification Search ........... 222/130; 264/296, 209.3, 328.1, 294, 295; 425/385, 425/383; 138/37
See application file for complete search history.

(56) References Cited

U.S. PATENT DOCUMENTS

| 3,895,634 | A | * | 7/1975 | Berger et al. ............. 604/14 |
| 3,929,943 | A | * | 12/1975 | Klimaszewski, Jr. ....... 264/489 |
| 4,537,320 | A | * | 8/1985 | Nielsen ................... 215/276 |
| 4,551,292 | A | * | 11/1985 | Fletcher et al. ............ 264/139 |
| 4,590,028 | A | * | 5/1986 | Rosenkranz et al. ........ 264/154 |
| 4,719,069 | A | * | 1/1988 | Reymann et al. ........... 264/296 |
| 4,952,134 | A | * | 8/1990 | Bartley et al. ............. 425/525 |
| 5,038,455 | A | * | 8/1991 | Guest ........................ 29/453 |
| 5,948,365 | A | * | 9/1999 | Macy et al. ................ 422/102 |
| 6,179,153 | B1 | * | 1/2001 | Huang ....................... 220/553 |

\* cited by examiner

*Primary Examiner*—Michael P. Colaianni
*Assistant Examiner*—Monica A. Huson
(74) *Attorney, Agent, or Firm*—Andrew Wilford

(57) ABSTRACT

A sample tube for injection molded with two cores in one base with an intermediate bottom forming a well for receiving the biological material. In a second stage, the bottom edge of the cylindrical wall is heated and turned inwardly to form preferably a rounded bottom of complementary contour to a stamp applied thereagainst in a thermal reforming operation.

2 Claims, 2 Drawing Sheets

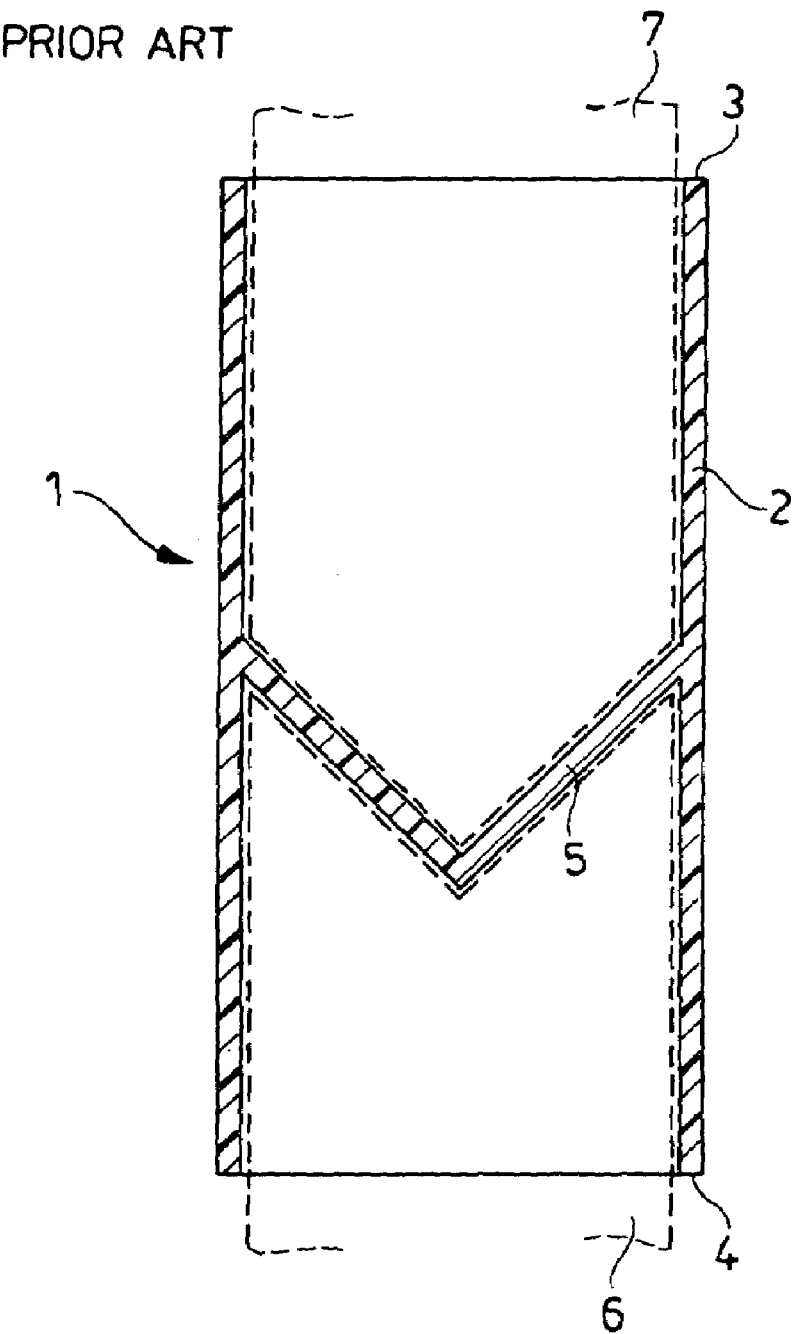

SAMPLING TUBE AND METHOD OF MAKING SAME

FIELD OF THE INVENTION

The present invention relates to a sampling vessel of synthetic resin material, usually injection-molded thermoplastic, which can be used to hold biological samples as blood, serum or urine and to a method of making the sampling tube.

BACKGROUND OF THE INVENTION

Sampling tubes injection molded from thermoplastic synthetic resin material have been provided in the past as cylindrical vessels, open at opposite ends and provided with an intermediate bottom or well in which the sample is retained and which serves to allow even a small specimen to have sufficient depth to enable its removal by the pipette or needle.

A tube of this type, for example for use with conventional laboratory instruments, can be received in a rack provided with cavities dimensioned to receive the sampling tubes and can have a diameter of say 12 mm and a length of 75 mm.

Because of the recessed configuration of the intermediate bottom, the sampled material, e.g. blood, urine or serum, can be of sufficient depth to enable removal of the sample or part of the sample and the open end of the tube insures easy accessibility to the sample. Since the needle or pipette tip for extraction the sample does not have to reach to the end of the tube but merely into the well, usually conical, provided in the intermediate bottom or partition, there is little danger of damage to the needle.

The entire tube is usually produced by an injection molding process in one piece from the thermoplastic synthetic resin and circularly cylindrical walls extend upwardly from the well to form the mouth of the vessel and downwardly from the well to provide a bottom which can rest on a horizontal surface or on a support in the rack. The tube can be produced by injection molding in one piece through the use of two cores which define the hollow spaces of the tube above and below the well-forming intermediate bottom.

A problem with the method of manufacture used to date has been that the use of two cores, which must be withdrawn in opposite directions from the tube, has limited the configuration of the sample tube to one in which the walls extend vertically in both directions from the bottom or well.

This can be a drawback when the receptacle in which the tube is to be received has a hemispherical or curvilinearly concave surface on which the tube is to stand. Racks, stands or holders of this shape cannot stably receive the cylindrical bottom wall of a sampling tube of the type described fabricated with two cores.

One solution to this problem, of course, is to initially provide a sampling tube with a rounded bottom in which the sampled material is to be received, but this solution does not have the advantages of an intermediate bottom or well located above the lower end of the tube as described above. Another possibility, of course, is to assemble the sampling tube of two pieces, one of which forms the lower part and is rounded. This system has the disadvantage that it requires additional assembly steps and increases the fabrication costs, which may be substantial especially when the tubes are to be mass produced.

Other systems may utilize hangers or lips of the sampling tube which suspend the sampling tube in the rack or otherwise solve the problem of stability by retaining the sampling tube in other ways on the holders.

None of these approaches, however, has proved to be satisfactory.

OBJECTS OF THE INVENTION

It is, therefore, the principal object of the present invention to provide an improved sample tube, especially for biological samples such as blood, urine and serum, which is especially suitable for use in mechanized laboratory equipment, whereby drawbacks of earlier tubes are avoided.

Another object of this invention is to provide a sample tube for the purposes described which can rest in a concave holder without instability problems arising when the lower end of the tube is formed by a cylindrical wall.

Another object of the invention is to provide an improved method of making a sample tube which satisfies the requirement for mass production and low cost and yet is capable of providing a tube which can be retained on a concave support.

SUMMARY OF THE INVENTION

These objects and others which will become apparent hereinafter are attained, in accordance with the invention in a sample tube which is formed in one piece with an intermediate bottom between upper and lower ends of the tube, vertical walls extending upwardly to the mouth of the tube and a lower wall extending to the bottom of the tube and a rounded bottom formed on the lower end of the tube.

According to the invention, the bottom end of the injection molded thermoplastic intermediate piece, previously provided with the well and the walls extending upwardly and downwardly from that well in the injection molding process, is thermally reformed by heating the bottom and simultaneously pressing a concave contour of a ram, complementary to the contour to be formed on the bottom of the tube, against the latter, thereby rounding upwardly the previously cylindrical bottom end of the tube.

The process of the invention thus involves, as a first step, the injection molding of an intermediate product which can correspond to the convention sampling tube previously described with its cylindrical wall extending from the intermediate bottom or well to the open end of the tube, the intermediate bottom itself which preferably tapers downwardly and is advantageously of conical configuration, and a lower cylindrical wall which extends from that intermediate bottom to the lower end of the intermediate product, all in one piece.

The second step of the process is the reshaping of the lower end of the intermediate product by thermally softening the lower end and pressing a shaping ram, plunger or stamp thereagainst which has the complementary contour of the shape to be imparted to the bottom of the tube.

The result, upon cooling, is a rounded bottom of the tube formed in one piece.

Of course, the invention also includes the sample vessel or tube formed in one piece of thermoplastic synthetic resin with cylindrical walls extending in opposite directions from the intermediate bottom but formed at the lower end with an inwardly turned portion directed toward the axis of the tube and preferably providing the rounded contour mentioned previously.

The point of the invention, of course, is that after formation of the intermediate product utilizing two cores by the injection molding process so that the intermediate bottom is provided in one piece with the walls of the tube, the cylindrical portion of the tube which is to constitute the bottom is thermally reformed by locally heating the bottom of the plastic tube intermediate product and shaping it with a contoured stamp or shaping surface to turn the outer edges of that cylindrical wall inwardly and permanently reshape the bottom. The rounded contour thus formed can be self-centering on the concave seats of conventional laboratory devices, racks or stands and need not precisely match the radius of curvature or contour thereof.

The fact that both the tube bottom and the seat are concave suffices to insure automatic centering. The result is a one piece sample tube with an intermediate well whose bottom has edges inwardly turned toward the axis.

Since the recesses or seats of conventional apparatus and racks, usually are hemispherical, in a specifically advantageous embodiment of the invention, the bottom of the tube has a convex curvature which can conform to a segment of a sphere.

The bottom of the tube, when reformed, can form a complete hemisphere or part thereof and or need not be completely closed and, indeed, according to the invention, an opening can be left in the bottom and merely the edges turned inwardly. The centering effect is nevertheless insured.

The geometric configuration of the bottom is not limited by the concavity of the shaping plunger and it can have a polyhedral, especially, tetrahedral, frustopyramidal, conical or frustoconical geometry depending upon the configuration of the supporting surface in the rack or stand. The tube itself need not be cylindrical but can be of a prismatic or polyhedral shape.

Preferably, the thermal reforming process is carried out at temperatures above the flow limit of the plastic utilizing a heated tool which is pressed axially against the bottom end of the intermediate product.

To protect the portions of the intermediate product which are not to be reshaped by the process from the effective temperature, especially upon heating of the bottom of the tube to a temperature above the flow limit of the plastic and to hold the tube during the reforming process, the tube can be engaged in an appropriate holder which can surround the tube immediately above the bottom portion to be reformed.

To prevent the tube from sliding in this holder, another member can press against the open end of the tube.

The holder preferably completely surrounds the tube and can be cooled. It is however also possible to engage the tube in an entirely conventional holder and to insulate that holder from the heated part of the apparatus.

BRIEF DESCRIPTION OF THE DRAWING

The above and other objects, features, and advantages will become more readily apparent from the following description, reference being made to the accompanying drawing in which:

FIG. 2 is a longitudinal section through a prior art sample tube with an intermediate bottom which can also serve as the intermediate product for the method of the invention.

SPECIFIC DESCRIPTION

Figure 1:
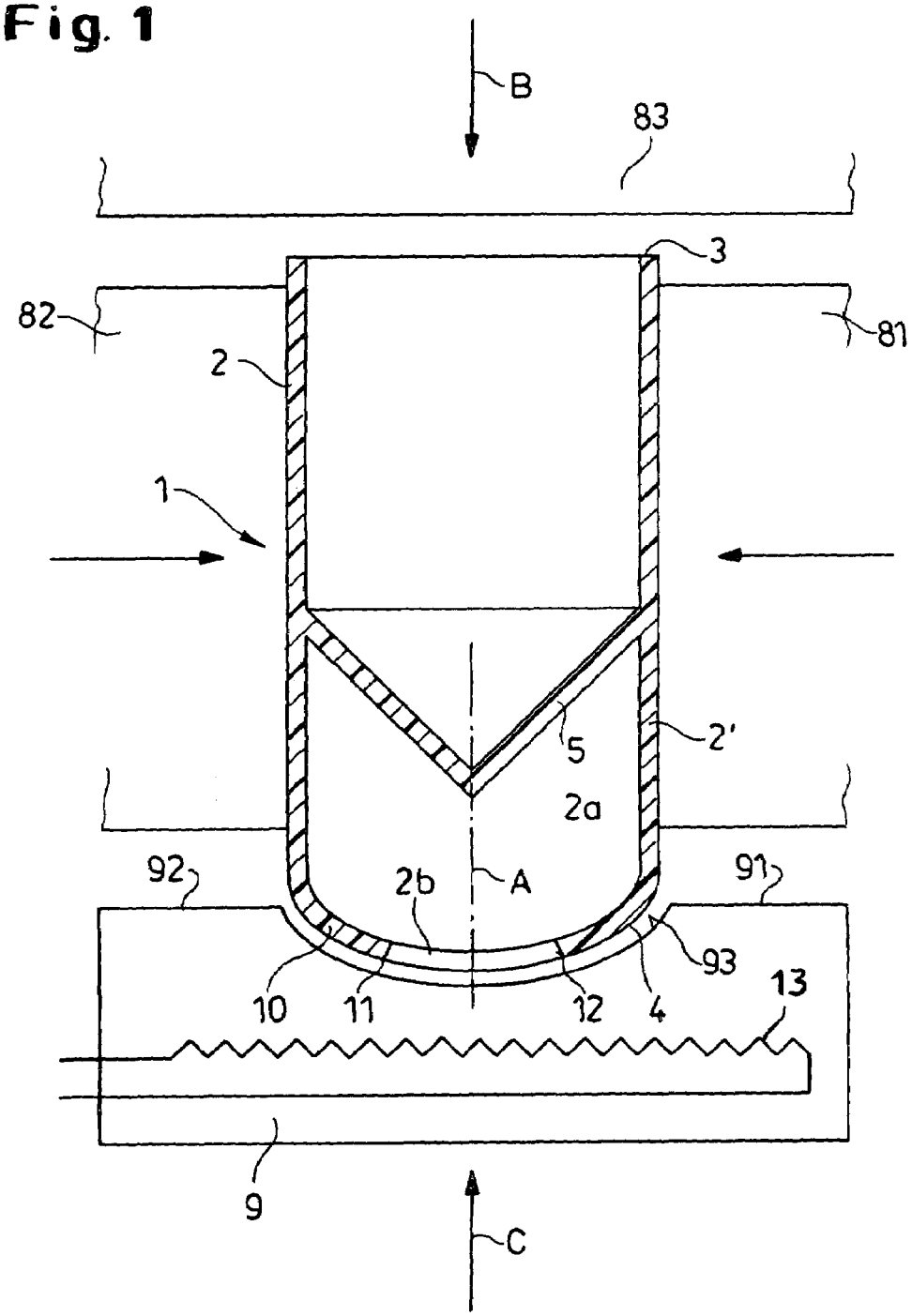
FIG. 1 is a longitudinal section through a simple tube according to the invention and the apparatus for making same in a highly diagrammatic form.

FIG. 1 shows the apparatus of the invention, in highly diagrammatic form, for producing the sample tube of the invention. The latter, also seen in FIG. 1, is represented at 1 and has a cylindrical wall two extending in one axial direction from an intermediate bottom or well 5 of conical shape and another cylindrical wall 2' extending in the other direction. The walls 2, 2' and the intermediate bottom are molded in one piece from a thermoplastic synthetic resin material. The tube has an upper end or mouth 3 through which the sample is introduced and form which the sample is extracted, e.g. by a pipette inserted through the mouth 3 into the well formed by the conical bottom 5 which insures that even for a small amount of liquid sample, the sample will rise to a relatively high level in the well.

The bottom formed at the opposite end 4 of the tube has inwardly turned portions 7 extending toward the axis A of the tube and possibly reaching the axis or meeting at the axis to close the lower space $2a$ of the tube. Normally, however, in opening $2b$ is left in the bottom of the tube. The rounded bottom self centers on the seats normally provided in rats or laboratory equipment, simple collectors and simple distributors which operated with automatically pipettes or sample distributing tubes or needles. The cylindrical bottom 4 of the tube thus serves as a stand or foot while the open end 3 is usually closed by a screw or plug cap (not shown).

In the production of the sample tube of the invention, an intermediate body is produced by the injection molding process (FIG. 2) with two cores 6 and 7 here illustrated in broken lines and which after the injection of the walls 2 and 2' and the partition 5 in one piece are withdrawn axially in opposite directions.

The intermediate product shown in FIG. 1 can then be engaged between the two parts 81, 82 of a holder embracing the tube 1 from opposite sides and composed of a thermally insulating material and/or composed of structures which are cooled. The clamp jaws 81 and 82 frictionally engage the cylindrical walls of the tube 1 and can be shaped to practically fully embrace the tube 1, leaving the top and bottom ends 3 and 4 freely.

At the top end 3, a third part of the apparatus, represented at 83 and forming an abutment to prevent movement of the tube 1 upwardly in the clamp 81, 82, is pressed against the tube end 3 in the direction of arrow B. This will prevent slip of the tube 1 in the friction clamp 81, 82.

In the illustration of FIG. 1, the abutment 83 has not yet engaged the intermediate tube 1.

According to the invention, the thus held intermediate tube 1, protected from heating except at its bottom 4, is engaged by a heated stamper or ram 9 provided with a heating element 13 shown as a resistance heater is pressed against the bottom 4 of the tube 1 in the direction of arrow C. The outer surface 91 and 92 of the stamp 9 are shaped complementarily to the shape to be imparted to the bottom 4 and thus include a concavity 93 which can correspond to the spherical segmental shape of a seat adapted to receive the tube in a laboratory machine or a laboratory stand. The contact with the stamp causes the tube bottom 4 to be heated to a temperature above its softening point and preferably above the flow temperature of the thermoplastic synthetic resin, which can be any plastic conventionally used for the fabrication of biological sample tubes, and to flow to the shape imparted by the stamp 9. The edges of the bottom 4 are thereby turned inwardly along the stamp contour toward the axis A to impart the convex curvature 10 to the bottom of the tube. It is not necessary that a complete bottom be formed and it suffices to form a partial rounding of the bottom as shown in FIG. 1 by the solid lines 11 and 12 which represent a degree to which the bottom wall is turned inwardly. The stamp 9 is then withdrawn and the one piece contoured bottom sample tube is removed. When the sample tube is then mounted in a laboratory apparatus or rack, the rounded bottom automatically orients itself and thereby facilitates removal of a sample by a pipette or the like.

I claim:

1. A method of making a sample tube, comprising the steps of:

injection molding an intermediate tube in one piece with a cylindrical wall and a conical intermediate bottom spaced between ends thereof, integral with said wall and having an apex turned toward an end of said intermediate tube thereby forming a well adapted to receive a biological sample;

heating said end of said intermediate tube and pressing edges of said end inwardly toward an axis of said intermediate tube to thermally reform said tube and provide an only partially closed bottom end for the sample tube; and rounding the bottom end of the sample tube outside an injection mold in which said tube is formed by pressing a heated stamp there against to cause said bottom end of said sample tube to be shaped to a concavity of a concave recess of said stamp and to be only partially closed by said stamp whereby said bottom end remains open and is self-orienting upon insertion of the sample tube into a stand to permit removal of the biological sample from said well by a pipette.

2. The method defined in claim 1 wherein said stamp heats said intermediate tube to a temperature at least equal to the flow temperature of a thermoplastic synthetic resin constituting said intermediate tube.

* * * * *